3,325,452
PREPARATION OF GLYCIDYL POLYETHERS
Wayne F. McWhorter and John E. Kuhn, Louisville, Ky., assignors to Celanese Coatings Company, New York, N.Y., a corporation of Delaware
Filed Mar. 15, 1966, Ser. No. 539,605
13 Claims. (Cl. 260—47)

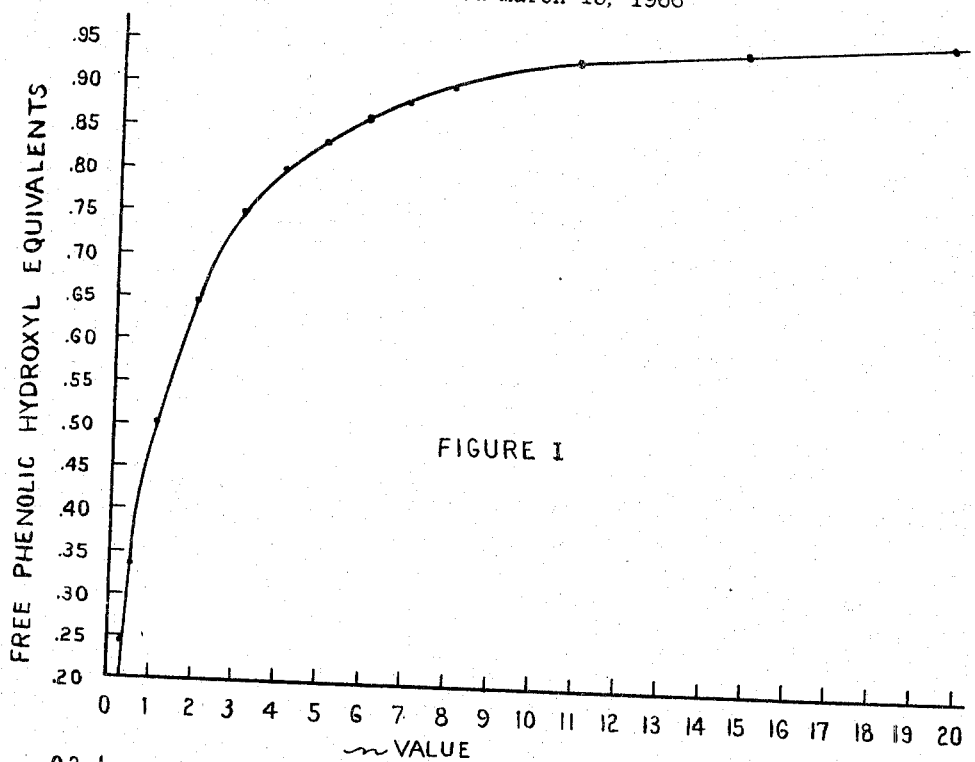
FIGURE I
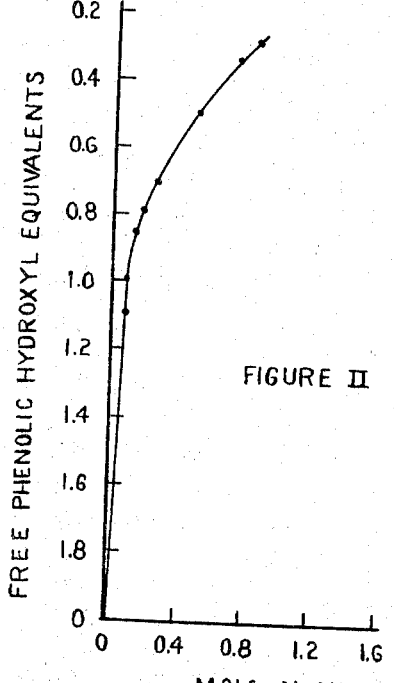
FIGURE II
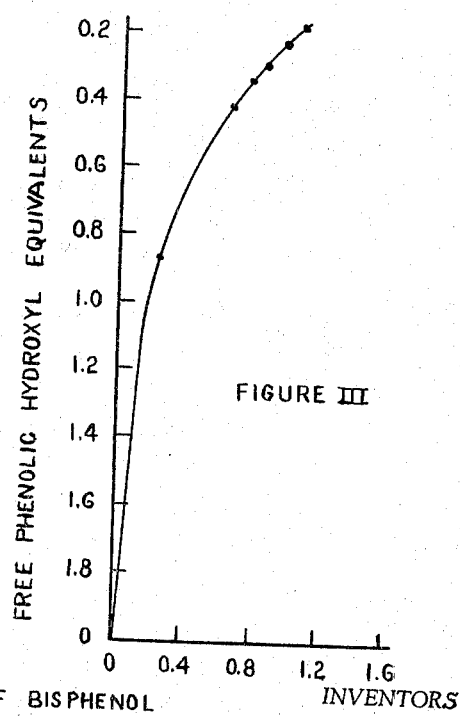
FIGURE III
MOLS NaOH PER MOL OF BISPHENOL
INVENTORS
WAYNE F. McWHORTER
JOHN E. KUHN
BY Norman L. Wilson Jr.

This application is a continuation-in-part of our co-pending U.S. patent application Ser. No. 34,200, filed June 6, 1960.

This invention relates to a novel process for the preparation of polymeric epoxide resins.

More particularly, this invention relates to a novel process for the preparation of linear polymeric glycidyl polyethers of dihydric phenols, which polyethers can be represented by the general formula:

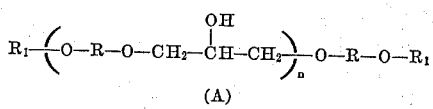

(A)

In this formula R represents the residue or nucleus of the dihydric phenol used in preparing the glycidyl polyether, i.e., the dihydric phenol molecule minus its phenolic hydroxyl groups, $R_1$ represents the epoxide-containing (glycidyl) residue

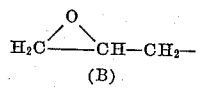

(B)

and $n$ indicates the extent of polymerization.

Illustrative of such glycidyl polyethers are those prepared from bisphenol A [2,2-bis (4-hydroxyphenyl) propane] and epichlorohydrin, i.e.,

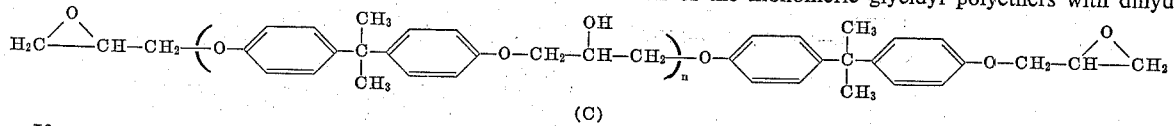

(C)

If $n$ were 0, Formulas A and B hereinabove would represent the monomeric diglycidyl ethers of the dihydric phenols used, e.g., Formula B would represent the diglycidyl ether of bisphenol A

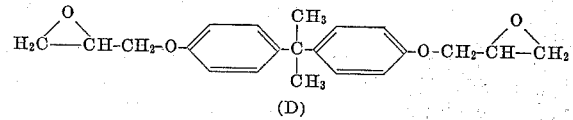

(D)

However, since the glycidyl polyethers prepared by the novel process of the present invention are mixtures of glycidyl polyethers of varying chain length, $n$ will always have an average value greater than 0, i.e., from about 0.25 to about 15, which, in the case of the reaction products of bisphenol A and epichlorohydrin represented by Formula C hereinabove, corresponds to glycidyl polyethers having molecular weights ranging from about 400 to about 2500 and, accordingly, softening points of from about 20° C. to about 130° C.

Linear polymeric glycidyl polyethers of dihydric phenols, which can also be referred to as polyepoxides or polyepoxide resins, have become increasingly important commercially in recent years. These thermosetting resins can be cured using a wide variety of curing or cross-linking agents to form insoluble, infusible films, pottings, castings, and the like, and are markedly superior in their physical, chemical and electrical properties to other cured thermosetting resins. First of all, they exhibit low shrinkage during curing, and the combination of hardness and toughness exhibited by the cured resins, as well as their resistance to degradation by solvents and other chemicals and their electrical properties, such as dielectric constant and resisistivity, can be classed as outstanding. At the same time, these properties can be varied within wide limits, depending on the end use intended for the resin.

Various methods of preparing these resins are well known in the art, and have been described in great detail in, for example, U.S. Patent Nos. 2,582,985; 2,615,007 and 2,615,008, all to Greenlee, as well as in Lee and Neville "Epoxy Resins" (New York: McGraw-Hill Book Company, Inc., 1957).

As shown in these references, typical prior art methods of preparing glycidyl polyethers of the type in question involve either a two-step reaction, wherein a relatively low molecular weight liquid glycidyl polyether is first prepared and then reacted with additional dihydric phenol, or a one-step process of reacting a dihydric phenol with epichlorohydrin wherein the ratio of epichlorohydrin to dihydric phenol is carefully controlled during the reaction.

Monomeric glycidyl polyethers of polyhydric phenols are prepared, as described in the prior art, by reacting a polyhydric phenol with epichlorohydrin in an excess of epichlorohydrin using caustic alkali substantially equivalent to the phenolic equivalents as the condensing and dehydrohalogenating agents. The excess epichlorohydrin serves as a solvent for the reaction and is recoverable when the reaction is completed. In this process, substantially all the phenolic hydroxyl groups of the polyhydric phenol are converted to glycidyl ether groups leaving no unreacted phenolic hydroxyls.

Polymeric glycidyl polyethers of polyhydric phenols are prepared as described in the prior art, by reacting monomeric glycidyl polyethers of dihydric phenols with additional dihydric phenols, or by reacting a dihydric phenol with controlled amounts of epichlorohydrin. In the reaction of the monomeric glycidyl polyethers with dihydric phenols, the glycidyl groups react with the phenolic groups forming glyceryl ether bridges between the components of the reaction, thus resulting in polymer formation.

A specific high molecular weight linear polymeric glycidyl polyether of a dihydric phenol (i.e., one having a specific $n$ value) can be also be obtained by reacting specific proportions of epichlorohydrin, varying from about 1.1 mols to about 2.6 mols thereof, per mol of dihydric phenol, with sufficient caustic alkali being used to ultimately combine with the chlorine liberated when the epichlorohydrin residue is dehydrohalogenated to a glycidyl residue. For example, in order to obtain a linear polymeric glycidyl polyether of bisphenol A having a molecular weight of about 460 to 483, epichlorohydrin and bisphenol A must be reacted, in the presence of an appropriate amount of caustic alkali, in the ratio of approximately 2.6 mols of epichlorohydrin to 1 mol of bisphenol A. Similarly, if a linear polymeric glycidyl polyether of bisphenol A having a molecular weight of about 510 to 710 is desired, epichlorohydrin and bisphenol A must be reacted in a mol ratio of 2.04 mols of epichlorohydrin per mol of bisphenol A, while such a polyether having a molecular weight of about 1420 can only be prepared by this prior art process by reacting epichlorohydrin and bisphenol A in a mol ratio of 1.22:1, respectively.

In this prior art process, the reaction is conducted by dissolving the dihydric phenol in a large quantity of water with caustic alkali substantially equivalent to the epichlorohydrin which is to be reacted. The reactants are heated to above 65° C. and the specific quantity of epichlorohydrin is added. The epichlorohydrin reacts with the dihydric phenol forming chlorohydrin ether groups which are immediately dehydrohalogenated to glycidyl ether groups. The glycidyl ether groups will then react with phenolic hydroxyl groups forming polymers. The extent of the latter reaction is dependent upon the ratio of epichlorohydrin to dihydric phenol. In this reaction, no epichlorohydrin is recoverable, since all of it is either reacted with the dihydric phenol or is converted to glycerine and other by-products by reaction with the caustic alkali and water.

It has now been found in the present invention that polymeric glycidyl polyethers of specific molecular weights can be prepared by partially reacting a dihydric phenol with epichlorohydrin in a large excess of epichlorohydrin, recovering the excess unreacted epichlorohydrin, and further reacting the partially reacted dihydric phenol (the intermediate condensate) with caustic alkali. More particularly, it has been found that there is a direct relationship between the degree of reaction of the intermediate condensate, as determined by its free phenolic hydroxyl content, and the molecular weight (generally expressed in major part by the number of moities defined by $n$) of the polyepoxide resin formed from said intermediate condensate on dehydrohalogenation.

The reaction of a dihydric phenol with epichlorohydrin in an excess of epichlorohydrin takes place as illustrated, using for the sake of simplicity, only one phenolic hydroxyl-containing moiety of the dihydric phenol reactant, which will be represented as

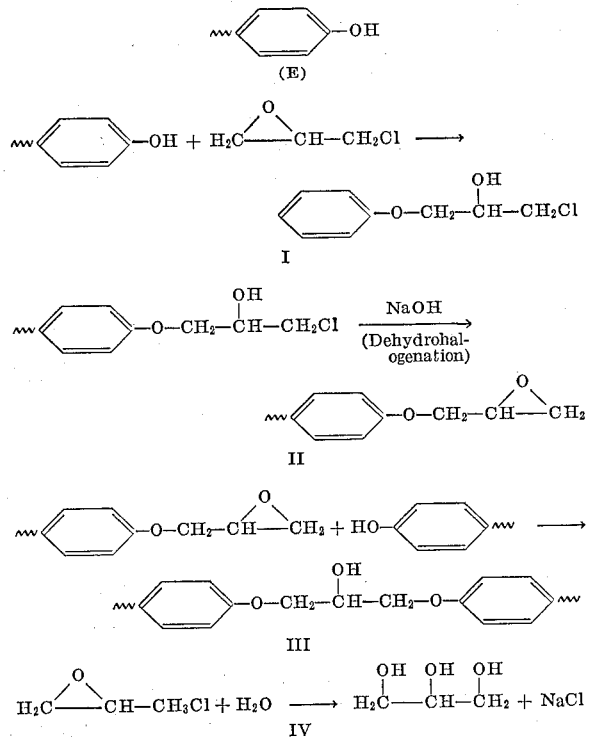

The major reactions among those illustrated above are I and II, the first of these being the addition of epichlorohydrin to the dihydric phenol to form the chlorohydrin ether of said dihydric phenol, which reaction can be termed the condensation reaction and the product obtained thereby the intermediate condensate, and the second being the dehydrohalogenation reaction whereby the chlorohydrin moieties in said intermediate condensate are substantially completely converted to epoxide-containing groups.

At elevated temperatures, e.g., above about 50° C., each of these reactions takes place concomitantly. Thus, caustic alkali catalyzes the dihydric phenol-epichlorohydrin (condensation) reaction, and at the same time reacts with the chlorohydrin ether of the dihydric phenol (intermediate condensate) formed in the condensation reaction, dehydrohalogenating it to form epoxide groupings.

The extent of both the condensation reaction and the dehydrohalogenation reaction is dependent upon the temperature of the reaction mixture and the ratio of epichlorohydrin to dihydric phenol therein. Thus, for example, at relatively low temperatures or at high epichlorohydrin:dihydric phenol ratios little dehydrohalogenation occurs, while at elevated temperatures, dehydrohalogenation readily takes place.

At temperatures above about 65° C., the first or condensation reaction takes place at a much faster rate than the dehydrohalogenation reaction, and, in the absence of other factors it would proceed to completion. However, the simultaneously occurring dehydrohalogenation reaction causes caustic alkali to be consumed. Thus, even though the dehydrohalogenation reaction proceeds at a slower rate than the condensation reaction, it has been found that as the chlorohydrin ether is formed the level of caustic alkali present is reduced, thus inhibiting the progress of the condensation reaction.

The present invention is based on the discovery that this seeming disadvantage can be used to advantage to prepare specific polyepoxide resins.

Thus, by operating the condensation reaction under dehydrohalogenating conditions, and at the same time carefully controlling the extent of condensation in the manner described hereinbelow, it is possible to terminate the reaction before all the dihydric phenol present condenses with the epichlorohydrin. This gives a specific partially reacted intermediate condensate having free phenolic hydroxyl groups (rather than merely alcoholic hydroxyl groups, which are also formed during the condensation reaction), from which unreacted epichlorohydrin can then be distilled, and which, upon subsequent dehydrohalogenation, gives a specific polyepoxide resin.

Obviously, it is also possible to carry out the novel process of the present invention so as to make different partially reacted intermediate condensates having different free phenolic hydroxyl contents, and thus a series of polyepoxide resins, having any desired molecular weights, can be made by a single process using an excess of epichlorohydrin beyond that required for complete reaction with the dihydric phenol, rather than the small, specific amounts formerly considered critical. Such a process lends itself much more readily to efficient plant operation, and especially to continuous operation, and in fact is easier to carry out than known processes used to prepare polyepoxide resins.

In such prior art processes, as stated above, epichlorohydrin and a dihydric phenol are reacted in specific critical ratios, which means that the epichlorohydrin present is kept to an irreducible minimum, and the polyepoxide resin is directly formed by the use of an amount of caustic alkali equivalent to the chlorine atoms in the epichlorohydrin present. However, the thus-formed polyepoxide resin is generally a viscous, taffy-like material, which can be extremely difficult to work due to the lack of sufficient epichlorohydrin to form a solution. As a result, it becomes increasingly difficult to stir the reaction mixture so as to bring about reaction between all the epichlorohydrin and the dihydric phenol. Furthermore, the large quantities of water present promote hydrolysis of the epichlorohydrin to undesirable side products.

In contrast to this, the novel process of the present invention permits the use of amounts of epichlorohydrin over and above those required for the condensation reaction, and thus the reaction medium is a solution, easy to process and handle.

In carrying out applicants' novel process, the system reacts vigorously, as evidenced by an exotherm, when the reactants and catalyst are first brought together, e.g., upon the first addition of caustic alkali to a mixture of epichlorohydrin and a dihydric phenol. As the quantity of chlorohydrin ether formed increases, the reactions taking place are believed to approach their equilibria at a fairly slow, controllable rate. In the initial stages of the process, the epichlorohydrin obviously does not react with all the phenolic hydroxyl groups present. This means that as the system approaches equilibrium during the later stages of the process, the unreacted phenolic hydroxyl groups will be slowly condensed with epichlorohydrin. Thus, it follows that if the initial condensation reaction is not carried to substantial completion, the resulting intermediate condensate will contain unreacted phenolic hydroxyl groups.

This condensate, upon removal of the excess epichlorohydrin, is a mixture which can contain dihydric phenols, e.g., unreacted starting material

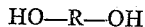

(F)

or partially condensed materials

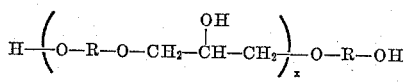

(G)

phenolic hydroxyl-terminated monochlorohydrin ethers of the dihydric phenol

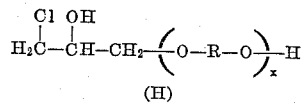

(H)

dichlorohydrin ethers of the dihydric phenol

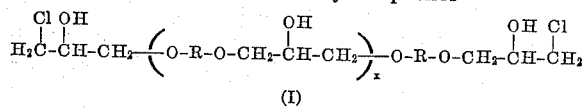

(I)

phenolic hydroxyl-terminated monoglycidyl ethers of the dihydric phenol

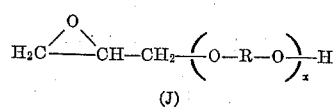

(J)

diglycidyl ethers of the dihydric phenol

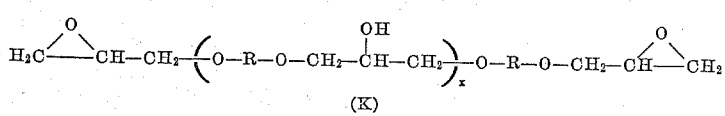

(K)

and monoglycidyl-monochlorohydrin ethers of the dihydric phenol

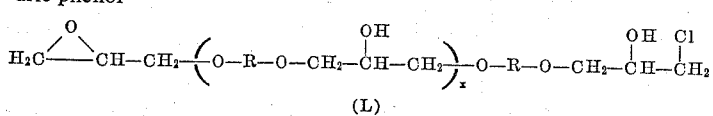

(L)

wherein R has the same meaning as set forth hereinabove for Formula A and X represents an integer, not necessarily the same in all cases, which can be 0 or greater, but generally less than 15.

Since on dehydrohalogenation the chlorohydrin ether moieties in the various possible components of this intermediate condensate will be substantially completely converted to glycidyl ether groups, said condensate is essentially a mixture of glycidyl ether-containing, glycidyl ether-forming and phenolic hydroxyl-containing components.

The efficiency of the novel process of the present invention is also attributable to the fact that it results in a substantial saving in epichlorohydrin. Not only is less epichlorohydrin lost in the overall process than in prior art processes, but it has also been found that less epichlorohydrin is consumed during the reaction itself, since only from about 1.05 to about 1.8 mols of epichlorohydrin are condensed per mol of dihydric phenol.

One would expect that when polyepoxide resins of the type in question are made by conventional prior art processes, the low mol ratios of epichlorohydrin to dihydric phenol employed would insure very little loss of epichlorohydrin. This, however, is not the case. For example, in a typical prior art process wherein 312 parts of a glycidyl polyether having a weight per epoxide of 200–250 are prepared using a ratio of 2.6 mols of epichlorohydrin per mol of dihydric phenol, the full 2.6 mols of epichlorohydrin are consumed per mol of the dihydric phenol. In contrast to this, only 1.75 mols of epichlorohydrin per mol of dihydric phenol are consumed in preparing 312 parts of the same resin by the novel process of the present invention, even taking into account an assumed 1% loss of epichlorohydrin during distillation.

This saving in epichlorohydrin is believed due to there being very little loss of epichlorohydrin through side reactions. For example, while reaction IV illustrated hereinabove takes place to some extent in conventional processes due to the presence of large quantities of water and quantities of caustic alkali equivalent to, or in excess of, the epichlorohydrin used, this side reaction is largely absent when carrying out the novel process of the present invention, inasmuch as large quantities of water are not used, and the amount of caustic alkali present is less than an equivalent of the amount of epichlorohydrin employed. Thus, applicants' novel process is efficient not only from an operational standpoint but also because lesser amounts of raw materials are necessary.

It has also been found that the novel process of the present invention produces polyepoxide resins having a lower epoxide equivalency per given melting point. In other words, more 1,2-epoxy groups are formed than by conventional processes, and the products obtained more closely approach the products which theoretically can be obtained.

When practicing applicants' novel process, using excess epichlorohydrin and less than an equivalent amount of caustic alkali, two reactions besides those illustrated hereinabove can also take place, namely,

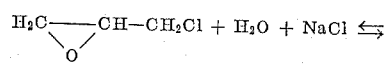

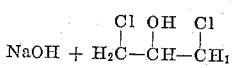

V

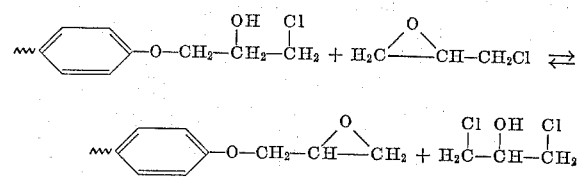

VI with reaction V being somewhat more likely to occur, depending on the method used to control the extent of condensation.

To understand how to control the condensation reaction so as to prepare the intermediate condensate, one should first consider reactions I and V hereinabove. From these reactions it can be seen that the phenolic hydroxyl content of the intermediate condensate is a function of both caustic alkali concentration and time. More particularly, the phenolic hydroxyl content is a function of caustic alkali concentration because the larger the amount of caustic alkali added prior to the time equilibrium is reached the further reaction I will proceed. It is also a function of time because, if after equilibrium conditions are reached, reaction V takes place, additional caustic alkali will be formed which will further catalyze reaction I.

Practically speaking, then, there are two methods which can be used to prepare a given intermediate condensate. The first of these entails operating the process under conditions such that reaction V does not take place, i.e., controlling the amount of caustic alkali present and the amount of water present with no special control of the reaction time. This is the preferred method of carrying out the novel process of the present invention.

The second method involves controlling the reaction time, i.e., continuing the reaction until the desired amount of condensation has occurred and then stopping the condensation reaction by removing the water therefrom, after which substantially no additional caustic alkali will form to further catalyze the condensation reaction. By operating according to this second method, reaction V is allowed to take place. Thus, a lesser amount of caustic alkali is employed initially than when operating according to said first method, and by means of reaction V additional caustic alkali is formed in situ, which will cause the condensation reaction to proceed to the same end point as that obtainable by practicing said first method.

If the process is carried out in such a manner that the amount of caustic alkali present is the only control variable, i.e., by said first method, then it must be carried out in such a manner that reaction V does not take place. This can be done either by removing a substantial amount of the water of condensation as it is formed during the course of the condensation reaction, or by stopping the condensation reaction before reaction V becomes pronounced. Thus, for example, all of the caustic alkali can be added at once, and the water of condensation can be removed within about one-half hour after the initial exotherm subsides, thus stopping the reaction.

However, this procedure can be followed only where the amount of caustic alkali involved is quite small, since where relatively large quantities of caustic alkali are involved, the heat generated by a single addition will be so great that some of the reactants may boil out of the system. Hence, when using large quantities of caustic alkali, incremental addition is desirable. Under these circumstances, a preferred mode of operation is to add a first increment of caustic alkali which is sufficiently large to bring the system to reflux temperature, i.e., to about 90° C. to 100° C., and then to add the remaining caustic alkali in amounts sufficient to maintain the system at reflux without the application of heat. Near the end of the reaction, when the heat generated by the addition of caustic alkali is not as great, it will be necessary to increase the size of the increments or to add increments at a faster rate to maintain the system at reflux. About one-half hour after all of the caustic alkali to be added has been consumed, the system can be distilled to remove water, thereby stopping the condensation reaction. Otherwise, as indicated hereinabove, reaction V will take place as the system approaches equilibrium, e.g., at a time from about one-half hour to about one hour after the last addition of caustic alkali.

As previously indicated, where time is chosen as the means whereby the system is controlled to give the desired intermediate condensate, the amount of caustic alkali used can be varied within a somewhat broader range. More particularly, an amount of caustic alkali slightly less than that found, when controlling the process by said first method, to give an intermediate condensate of desired phenolic hylroxyl content can be employed. Then, after the heat of reaction has been dissipated, additional heat is supplied to keep the system at a temperature of about 104° C. until such time as the phenolic hydroxyl content, determined analytically, approaches the desired value. At this point, water and excess epichlorohydrin are removed from the system by distillation, thus giving a specific intermediate condensate known, by virtue of its phenolic hydroxyl content, to give a specific polyepoxide resin on dehydrohalogenation.

When controlling the process by means of this second method the condensation reaction may continue to a slight extent during distillation of the water and excess epichlorohydrin, due primarily to the fact that condensation rates are not the same for all dihydric phenols and catalysts. This can be compensated for by allowing for distillation time in the analytical determination of phenolic hydroxyl content. This is another reason why making time a constant so that the amount of caustic alkali present becomes the control variable is the preferred means of controlling applicants' novel process.

Numerous analytical methods are available for determining the phenolic hydroxyl content of the intermediate condensate. Among these are methods involving the use of reagents, e.g., the Millon reagent, referred to in Chapter 4 of Snell & Snell, "Colorimetric Methods of Analysis," vol. 3 (New York: D. Van Nostrand Co., Inc., 1953). Another useful method involves the use of near-infrared analysis, as described by Holman and Edmondson in Analytical Chemistry, vol. 28 (1956) at page 1533.

An indirect method for determining the phenolic hydroxyl content of the intermediate condensate can be practiced as follows. The reaction is carried out as described in the working examples given hereinbelow but using tared reaction vessels and molar quantities of reactants and catalyst. The weight of the intermediate condensate and salt formed is determined after removal of unreacted epichlorohydrin, and the weight increase due to reacted epichlorohydrin is then calculated according to the following equation:

Weight increase due to reacted epichlorohydrin=Weight of intermediate condensate plus salt—(Weight of dihydric phenol plus caustic alkali minus water of reaction)

Next, the salt is removed from the intermediate condensate, the condensate is weighed, and the weight per epoxide is determined by standard methods. The epoxide equivalent of the intermediate condensate is then calculated by dividing the weight of the intermediate condensate by the weight per epoxide.

If the thus-obtained value for the epoxide equivalent is equal to or less than the equivalents of caustic alkali used, then the weight increase due to reacted epichlorohydrin needs no correction factor. If, however, the value of the epoxide equivalent exceeds the equivalents of caustic alkali (due to the occurrence of reaction VI, illustrated hereinabove), a correction factor is needed. This correction factor is calculated by multiplying 36.5, the molecular weight of HCl, by the difference between the epoxide equivalent and the sodium hydroxide equivalent. This correction factor is then added to the figure for the weight increase due to reacted epichlorohydrin, which gives the total weight (in mols) of epichlorohydrin condensed. Finally, by subtracting two from the total weight of epichlorohydrin condensed the equivalent of unreacted phenolic hydroxyl groups present is obtained.

A reasonably accurate method of determining the number of mols of epichlorohydrin condensed per mol of dihydric phenol, which can in turn be converted into a value for the phenolic hydroxyl content of the intermediate condensate in the manner set forth in the preceding paragraphs, involves first measuring the viscosity of the intermediate condensate. This can be done by removing a sample from the reaction vessel, separating unreacted epichlorohydrin therefrom by flash distillation, and then filtering out the salt. The viscosity of this purified sample can then be determined, using a solvent if necessary, and this viscosity can then be compared with a previously prepared curve plotting viscosity against the mols of epihalohydrin reacted per mol of dihydric phenol (unreacted phenolic hydroxyl content).

Dihydric phenols have previously been reacted with epichlorohydrin using less than the stoichiometric amount of caustic alkali. In these prior art processes, however, low temperatures were employed so that a dehydrohalogenation reaction would not accompany the condensation reaction. Thus, to the best of applicants' knowledge the concept of altering the reaction rates of the concomitant condensation and dehydrohalogenation reactions has not been previously employed.

Similarly, in prior art processes wherein relatively high temperatures were employed, the condensation reaction has been carried out in such a manner that substantially all of the dihydric phenol was converted to chlorohydrin ether before dehydrohalogenation could occur. Again, insofar as applicants have been able to determine it was not believed possible, according to the prior art, to prepare partially reacted intermediate condensates in a manner which would give reproducible results. Contrary to this belief, the present invention, which as previously indicated is based essentially on the discovery of the direct relationship between the phenolic hydroxyl content of the intermediate condensate and the molecular weight of the ultimately obtained polyepoxide resin, provides a process whereby intermediate condensates of any desired phenolic hydroxyl content can be made and reproduced.

In practicing the novel process of the present invention, changes in temperature and epichlorohydrin-dihydric phenol ratio produce variations in the condensation products obtained which are somewhat less pronounced than those produced by varying the caustic ratio or the time. For example, with respect to the epichlorohydrin-dihydric phenol ratio, various resins within the molecular weight range of about 460–1600 can be made, using from about 3 mols to about 20 mols of epichlorohydrin per mol of dihydric phenol, by simply varying the amount of caustic alkali employed. Of course, if epichlorohydrin and dihydric phenol are used in a mol ratio of less than 3:1, respectively, a resin having a molecular weight as low as 460 cannot be made.

With respect to reaction temperature, the only requirement is that it be high enough to insure that the overall reaction conditions are as favorable for dehydrohalogenation as for epichlorohydrin-phenol condensation. Normally, except during the removal of water and unreacted epichlorohydrin from the system, the reaction temperature will be below the reflux temperature of the system, and will generally be from about 50° C. to about 100° C., depending on the reactants employed. Temperatures above 100° C., e.g., up to about 150° C., can of course be used, particularly (although not necessarily) if pressures above atmospheric are employed, while at the lower end of the temperature range the only requirement is that the temperature employed must be sufficiently high to promote the dehydrohalogenation reaction.

Thus, a preferred embodiment of the novel process of the present invention includes reacting a dihydric phenol such as bisphenol A with epichlorohydrin at reflux temperature, using caustic alkali as the catalyst, to produce an intermediate condensate having a predetermined phenolic hydroxyl content in the range of from about 0.2 to about 0.95 phenolic hydroxyl group per mol of said dihydric phenol employed. The amount of caustic alkali used will be from about 0.5 mol to about 1.9 mols less than the stoichiometric quantity, i.e., from about 0.1 to about 1.5 mols per mol of dihydric phenol.

The molecular weight of the glycidyl polyether obtained from the thus-prepared intermediate condensate by stripping said condensate free of unreacted epichlorohydrin and then dehydrohalogenating in the conventional manner, expressed approximately in terms of the value of $n$, is determined by the equation $$n = OH/(1-OH)$$

wherein $n$ represents, as defined hereinabove, the average number of repeating

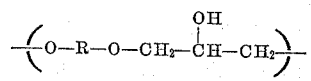

units in the polyether molecule and OH represents the number of unreacted phenolic hydroxyl groups per mol of dihydric phenol starting material (which quantity is subsequently referred to as the phenolic hydroxyl content of the intermediate condensate).

As indicated above, whether applicants' novel process is carried out on a time basis or by the preferred method of controlling caustic alkali addition, the $n$ value of the final polyepoxide resin is directly proportional to the amount of caustic alkali employed and to the phenolic hydroxyl content of the intermediate condensate. However, there will be some variance from dihydric phenol to dihydric phenol. Also, it has been noted that as the ratio of epichlorohydrin to dihydric phenol increases, the proportionality constant will also vary because of the dilution of the system. Thus, when bisphenol A and epichlorohydrin are reacted using 0.4 mol of caustic alkali, the phenolic hydroxyl content of the intermediate condensate in a 5:1 epichlorohydrin:bisphenol A system is 0.65, whereas in a 10:1 epichlorohydrin:bisphenol A system it is 0.57.

Since a direct, demonstrable relationship exists between the amount of caustic alkali employed (when less than a stichiometric amount is used) and the molecular weight of the resulting polyepoxide resin, it is believed unnecessary to include herein data and curves which would result from the use of all possible reactants and mol ratios thereof. Nevertheless, given the relationships set forth in the description and tables herein, the necessary modifications in the case of other reactants or mol ratios thereof different from those specifically set forth herein can readily be made by one skilled in the art to give, in every case, an intermediate condensate having a desired phenolic hydroxyl content, and from this, the desired polyepoxide resin.

To further illustrate the discovery that the quantity of caustic alkali employed is in direct proportion to the phenolic hydroxyl content of the intermediate condensate, reference is made to the accompanying drawing wherein:

FIGURE 1 is a curve showing the relationship between the phenolic hydroxyl content of the intermediate condensate and the value of $n$ in the polyepoxide resin resulting from the dehydrohalogenation of said intermediate condensate;

FIGURE 2 is a curve showing the relationship between the caustic alkali present and the phenolic hydroxyl content of the intermediate condensate when the mol ratio of epichlorohydrin to bisphenol A is 10:1, respectively, and FIGURE 3 is a curve showing the relationship between the caustic alkali present and the phenolic hydroxyl content of the intermediate condensate when the mol ratio of epichlorohydrin to bisphenol A is 5:1, respectively.

The present invention can perhaps be better understood by reference to the following working examples (including Table A). These examples illustrate not only the preparation of polymeric glycidyl polyethers by the novel process of the present invention, but also the relationship of the presence of water to reaction times. In these examples "hydroxyl content" means "phenolic hydroxyl equivalents," and all parts and percentages are by weight, unless otherwise stated.

*Example I*

Into a three liter three neck flask equipped with a thermocouple, agitator and reflux condenser there were charged 228 grams of bisphenol A (1 mol), 925 grams of epichlorohydrin (10 mols) and 9 grams of water (1 percent, based on the weight of epichlorohydrin). This mixture was heated to 60° C., and 8.4 grams of potassium hydroxide were then added. Next, the external heat was removed and the reaction mixture was allowed to exotherm to 109° C. When the temperature of the flask contents dropped to 95° C., an additional 8.4 grams of potassium hydroxide were added, and the reaction mixture was then allowed to exotherm to 99° C. When the exotherm subsided heat was applied and the flask contents were heated at 105.5° C. (reflux) for a period of one hour. Following this reaction period the epichlorohydrin was distilled off by first raising the temperature gradually to 150° C., and then, under vacuum (1 mm. Hg) raising the temperature to 160° C. The resulting intermediate condensation product weighed 328 grams, had a weight per epoxide of 799, a percent hydrolyzable chlorine of 9.3 and a phenolic hydroxyl content of 0.76 equivalent. This intermediate condensate when dehydrohalogenated using a stoichiometric amount of sodium hydroxide (+10 percent excess), based on hydrolyzable chlorine content, yielded a polymeric glycidyl polyether resin having a weight per epoxide of 610.

Another resin was prepared using the same quantities of materials and procedure as above, except that the reaction mixture, after the last addition of potassium hydroxide, was heated for three hours instead of one. The resulting intermediate condensation product (338 grams) had a weight per epoxide of 637, a percent hydrolyzable chlorine of 9.2, and a hydroxyl content of 0.60. After dehydrohalogenation, the polymeric glycidyl polyether resin obtained from said intermediate condensation product had a weight per epoxide of 390.

This procedure was again repeated with one exception, namely, the reaction mixture, after the last addition of potassium hydroxide, was heated for six hours rather than one. The amount of intermediate condensation product obtained was 347 grams, and it had a weight per epoxide of 533, a percent hydrolyzable chlorine content of 9.1 and a hydroxyl content of 0.46. The polymeric polyglycidyl polyether resin obtained after dehydrohalogenation had a weight per epoxide of 310.

*Example II*

In accordance with the procedure of Example I hereinabove, 110 grams of resorcinol (1 mol), 925 grams of epichlorohydrin and 9 grams of water (1 percent, based on the weight of epichlorohydrin) were heated to 60° C., and 6 grams of sodium hydroxide (98 percent pure) were added. Heating was discontinued and the reaction mixture allowed to exotherm to 109° C. When the temperature of the flask contents dropped to 95° C., an additional 6 grams of sodium hydroxide were added and the reaction mixture allowed to exotherm to 99° C. When the exotherm subsided, heat was applied and the flask contents were heated at 105.5° C. (reflux) for a period of one hour. The epichlorohydrin was then distilled off in the manner described in Example I. The resulting intermediate condensation product weighed 234 grams, had a weight per epoxide of 700, a percent hydrolyzable chlorine of 15.5, and a hydroxyl content of 0.53. The polymeric glycidyl polyether resin obtained by dehydrohalogenating said intermediate condensation product, using a stoichiometric amount of sodium hydroxide, had a weight per epoxide of 220.

Another resin was prepared using the same quantities and procedure just described, except that the reaction mixture, after the last addition of sodium hydroxide, was heated for 6 hours instead of one. The resulting intermediate condensation product (250 grams) had a weight per epoxide of 454, a percent hydrolyzable chlorine of 15.8 and a phenolic hydroxyl content of 0.17. After dehydrohalogenation, the polymer glycidyl polyether resin obtained had a weight per epoxide of 180.

*Example III*

In a reaction vessel equipped with a thermocouple, feeder, water cooled downward condenser and agitator, 362.5 parts of bisphenol A and 743.4 parts of epichlorohydrin (either fresh or from the separator to be mentioned later) were heated with agitation to 71° C. and 6.2 parts by weight of flake sodium hydroxide were then added. Through the use of a cooling system the reaction mixture was allowed to exotherm at 95° C. to 98° C., and then held at that temperature for 30 minutes after the addition of the caustic. At this temperature some epichlorohydrin and water came off through the condenser into a separator, and the epichlorohydrin was recovered for reuse. The temperature was maintained at 95° C. to 98° C. by the addition of individual 3.1 part increments of sodium hydroxide at five minute intervals for a period of twenty-five minutes. At the end of this time the addition of sodium hydroxide was increased to 4 part increments at five minute intervals for an additional 65 minutes to keep the temperature at the same level, with the temperature being maintained at 95° C. to 98° C. for ten minutes after the last addition. An epichlorohydrin-water azeotrope was then distilled off by first raising the temperature gradually to 149° C., and then, under vacuum (28.5 in. Hg), raising the temperature to 160° C. The intermediate condensation product was cooled to 110° C. and 500 parts by weight of water were added. When the temperature of the resulting mixture dropped to 66° C., 157.7 parts of an aqueous 50% sodium hydroxide solution were added and the temperature raised to 71° C.–74° C., where it was held for one and one-half hours. The mother liquor was then drawn off and 628.9 parts of methyl isobutyl ketone were added to the vessel contents and heated with agitation to 82° C. The reaction mixture was then neutralized with an aqueous 30% phosphoric acid solution to a pH of 6.8–7.2, and the water which separated out was drawn off. The remaining water was removed by azeotropic distillation at 114° C. to 116° C., at which temperature an additional 25 to 30 parts of methyl isobutyl ketone were added. To insure that the system was free of water an additional 220 parts of methyl isobutyl ketone were distilled off. The vessel contents were then cooled to 93° C., filtered, and the ketone removed by distillation to produce a resinous glycidyl polyether having a weight per epoxide (epoxide equivalent) of 235, a melting point of 25° C., and percent hydrolyzable chlorine of 0.14.

To further illustrate the effects of amount of caustic alkali and time on the final products, reference is made to the working examples summarized in Table A hereinbelow, which illustrates other ratios, temperatures and reaction periods.

TABLE A

| Mol Ratios | | Analysis of Intermediate Condensate | | | | | | | Analysis of Resin—Weight per Epoxide (Epoxide Equivalent) |
|---|---|---|---|---|---|---|---|---|---|
| Epichlorohydrin to Phenol (Bisphenol A) | Sodium Hydroxide to Phenol | Time (hrs.) | Temperature (° C.) | Weight (grams) | Weight per Epoxide | Percent Chlorine [1] | Viscosity (Gardner-Holdt) [2] | Phenolic Hydroxyl Content | |
| 10:1 | 0.098 | 1 | 108 | 307 | 2,041 | 8.6 | P–Q | 1.08 | Phenol |
| 10:1 | 0.098 | 3 | 108 | 312 | 1,647 | 8.9 | M–N | 1.02 | Phenol |
| 10:1 | 0.098 | 6 | 108 | 330 | 1,166 | 9.7 | K | 0.79 | 710 |
| 10:1 | 0.490 | 1 | 102 | 338 | 653 | 8.9 | H–I | 0.60 | 390 |
| 10:1 | 0.490 | 3 | 102 | 345 | 582 | 8.9 | G–H | 0.50 | 320 |
| 10:1 | 0.490 | 6 | 102 | 349 | 519 | 8.7 | G | 0.44 | 305 |
| 10:1 | 0.686 | 1 | 99 | 349.5 | 462 | 8.0 | ---------- | 0.39 | 294 |
| 10:1 | 0.686 | 3 | 99 | 352 | 424 | 7.7 | ---------- | 0.33 | 273 |
| 10:1 | 0.686 | 6 | 99 | 356 | 407 | 7.7 | ---------- | 0.27 | 256 |
| 10:1 | 0.98 | 1 | 98 | 350 | 349 | 6.5 | ---------- | 0.29 | 260 |
| 10:1 | 0.98 | 3 | 98 | 349 | 318 | 6.0 | ---------- | 0.26 | 255 |
| 10:1 | 0.98 | 6 | 98 | 353.5 | 242 | 3.3 | ---------- | 0.06 | 205 |
| 10:1 | 1.47 | 1 | 96 | 350 | 243 | 3.3 | ---------- | 0.09 | 210 |
| 10:1 | 1.47 | 3 | 96 | 355 | 244 | 3.6 | ---------- | 0.05 | 204 |
| 10:1 | 1.47 | 6 | 96 | 325 | 1,002 | 9.0 | ---------- | 0.82 | 775 |
| 5:1 | 0.294 | 1 | 107 | 337 | 865 | 9.2 | ---------- | 0.67 | 490 |
| 5:1 | 0.294 | 3 | 107 | 339 | 753 | 9.3 | ---------- | 0.62 | 401 |
| 5:1 | 0.294 | 6 | 107 | 344 | 483 | 7.7 | ---------- | 0.47 | 310 |
| 5:1 | 0.294 | 1 | 99 | 346.5 | 447 | 7.6 | ---------- | 0.39 | 295 |
| 5:1 | 0.294 | 3 | 99 | 356.5 | 418 | 7.8 | ---------- | 0.28 | 260 |
| 5:1 | 0.294 | 6 | 99 | 343.5 | 365 | 6.3 | ---------- | 0.37 | 280 |
| 5:1 | 0.98 | 1 | 98 | 344 | 359 | 6.2 | ---------- | 0.36 | 278 |
| 5:1 | 0.98 | 3 | 98 | 346.5 | 344 | 5.9 | ---------- | 0.33 | 275 |
| 5:1 | 0.98 | 6 | 98 | 313 | 1,101 | 8.2 | L–M | 0.97 | ---------- |
| 3:1 | 0.294 | 1 | 112 | 324 | 934 | 8.4 | K–L | 0.83 | 850 |
| 3:1 | 0.294 | 3 | 113 | 329 | 832 | 8.3 | K | 0.75 | 600 |
| 3:1 | 0.294 | 6 | 116 | 333.5 | 517 | 6.9 | ---------- | 0.59 | 386 |
| 3:1 | 0.686 | 1 | 102 | 338 | 480 | 6.8 | ---------- | 0.53 | 327 |
| 3:1 | 0.686 | 6 | 104 | 341 | 1,073 | 10.5 | ---------- | 0.66 | 480 |
| 10:1 | 0.294 | 1 | 80 | 343 | 1,028 | 10.6 | ---------- | 0.63 | 430 |
| 10:1 | 0.294 | 3 | 80 | 350 | 945 | 10.8 | ---------- | 0.54 | 340 |
| 10:1 | 0.294 | 6 | 80 | | | | | | |

[1] Hydrolyzable Chlorine Content.
[2] 60 percent non-volatile content in Butyl Carbitol.

This study demonstrates the effect of time at one, three and six hours, holding the temperature constant (at reflux), with an epichlorohydrin to bisphenol A ratio of 10 to 1, using 0.3 mol sodium hydroxide per mol of bisphenol A.

*Example IV*

Three 3-neck 2-liter flasks were set up equipped with stirrers, thermometers and reflux condensers. To each flask was charged 925 grams of epichlorohydrin (10 mols), 228 grams of bisphenol A (1 mol) and 9 grams of water (1 percent, based on the weight of epichlorohydrin). Once the reactants were dissolved the flasks were heated to 60° C. and 12 grams of sodium hydroxide (98 percent purity; 0.294 mol) were added. The flasks were then heated to 90° C., at which point heating was discontinued and the exotherm was allowed to take the temperature of the reaction mixture to reflux. The time at which reflux was reached was taken as zero time. Heat was then applied to hold the temperature at reflux (104° C.) for the specified time (1 hour—Sample A, 3 hours—Sample B, 6 hours—Sample C). After the specified times, the flasks were fitted with distillation condensers and the epichlorohydrin was distilled to a pot temperature of 150° C. Vacuum was then applied (1 mm.) and the flask contents were heated to 160° C. to insure complete removal of all volatile material. Each intermediate condensate was weighed to determine the weight increase due to condensed epichlorohydrin, and the weight per epoxide, percent active chlorine and Gardner viscosity (60 percent N.V. in butyl Carbitol) determined for each intermediate condensate are given in the following table:

TABLE B

| Sample | Wt. Increase (grams) | Weight per Epoxide | Percent Active Chlorine | Gardner Viscosity |
|---|---|---|---|---|
| A | 106 | 959 | 9.1 | K |
| B | 117.5 | 841 | 9.3 | I |
| C | 128.5 | 701 | 9.3 | H |

The dehydrohalogenation of these intermediate condensates was completed by reaction with aqueous sodium hydroxide equivalent (+10 percent excess) to active chlorine content at reflux for 90 minutes. The water was then poured off the taffy-like resins, and these resins were taken up in methyl isobutyl ketone and the resulting solutions neutralized with aqueous 30% phosphoric acid. The water was then azeotroped off and each resin solution was filtered, then vacuum distilled. The resinous products had a weight per epoxide of: A=750, B=500, C=325.

In order to determine whether the epichlorohydrin-bisphenol condensation reaction can be slowed or stopped by the removal of water from the reaction mixture the following set of experiments was run.

*Example V*

Using the same apparatus as described in Example IV above, except that downward distillation condensers were used in place of reflux condensers, each flask was charged as in Example IV and heated to 60° C. At this point 6 grams of sodium hydroxide (98 percent purity) were added. Heat was removed at 90° C., allowing the exotherm to raise the temperature just to the distillation point. When the exothermic reaction was over, 6 additional grams of sodium hydroxide were added and heat was immediately applied to bring the flask contents to distillation temperature (104° C.). The temperature was then raised to 122° C., at which point essentially all the water had been removed. The temperature was then lowered to 104° C. for the specified times, taking the time the contents first began to distill as zero time (1 hour—Sample D, 3 hours—Sample E, 6 hours—Sample F). The intermediate condensates were then dehydrohalogenated as described in Example IV. The weight increase due to epichlorohydrin, weight per epoxide and percent active chlorine determined for the intermediate condensates, and the weight per epoxide determined for the final polyepoxide resin are given in the following table:

TABLE C

| Sample | Intermediate Condensate | | | Glycidyl Polyether, Weight per Epoxide |
|---|---|---|---|---|
| | Weight Increase | Weight per Epoxide | Percent Active Chlorine | |
| D | 107.5 | 1,060 | 9.2 | 860 |
| E | 113.5 | 980 | 9.5 | 625 |
| F | 113.5 | 962 | 9.7 | 625 |

On comparing these results with those of Example IV above, it can be readily seen that the condensation reaction (Reaction I) and the disproportionation reaction (Reaction V) are virtually stopped by the removal of water. This enables reproducible runs to be made which are independent of time.

Referring once more to the drawing, it will be noted from FIGURE 1 that the value of $n$ for the polyepoxide resin increases as the free phenolic hydroxyl content of the intermediate condensate increases. In other words, when an intermediate condensate having a lower free phenolic hydroxyl equivalent is dehydrohalogenated, a lower molecular weight polyepoxide resin will result than from the dehydrohalogenation of an intermediate condensate having a higher free phenolic hydroxyl equivalent. This curve, or its equation, can also be used when preparing intermediate condensation products. For instance, when a polymeric glycidyl polyether of bisphenol A having a specific $n$ value is desired, that value of $n$ is substituted in the equation $$OH = n/(n+1)$$

The reactants are then brought together under conditions which will result in an intermediate condensate having this specific phenolic hydroxyl content. When the resulting intermediate condensate is dehydrohalogenated, the polyepoxide resin obtained will have the predetermined $n$ value.

FIGURES 2 and 3 illustrate the amounts of caustic alkali used in obtaining intermediate condensates having particular free phenolic hydroxyl contents. These quantities serve as a guide when dihydric phenols other than bisphenol A are used and when time is a factor. When the reaction is carried out in such a manner that additional caustic alkali is not formed by a disproportiontion reaction (reaction V illustrated hereinabove), exact amounts can be taken from these curves. Again, FIGURE 2 shows the amount of caustic alkali in relation to the phenolic hydroxyl content of the intermediate condensate when the mol ratio of epichlorohydrin to bisphenol A is 10:1, and FIGURE 3 illusttrates this relationship when the mol ratio is 5:1.

The foregoing working examples, tables and curves graphically illustrate the advantages afforded by the novel process of the present invention. More particularly, it can be seen that by following applicants' teachings one can readily react a dihydric phenol with an excess of epichlorohydrin and yet prepare polymeric glycidyl polyether resins having any desired molecular weight. The working examples show the fixed relationship between the free phenolic hydroxyl content of the intermediate condensate and the molecular weight of the final product. The working examples and tables also indicate that while the amount of caustic alkali used will vary somewhat for different dihydric phenols and different epichlorohydrin: dihydric phenol mol ratios, the points obtained will nevertheless be on the same curve. Thus, the amount of caustic alkali to be used in any given situation can easily be determined.

Finally, the working examples illustrate that various epichlorohydrin:dihydric phenol mol ratios can be used, and that variations can be made in the initial reactants.

It has been shown, for instance, that potassium hydroxide and sodium hydroxide function in the same manner. Accordingly, the expression "caustic alkali" as used herein is intended to cover both sodium hydroxide and potassium hydroxide.

Similarly, it is evident that other substitutions which would be obvious to one skilled in the art can also be made. For example, mononuclear dihydric phenols such as catechol, orcinol and xylorcinol, and polynuclear dihydric phenols such as 4,4'-dihydroxybenzophenone; 1,1-bis(4-hydroxyphenol) ethane; 1,1-bis(4-hydroxyphenyl) isobutane; 2,2-bis(4-hydroxyphenyl) butane; 2,2-bis(4-hydroxy-2-methylphenyl) propane; bis (2-hydroxynaphthyl) methane and 1,3-dihydroxynaphthalene, and the like, can be used in addition to or instead of bisphenol A or resorcinol.

The phenolic hydroxyl content of the free phenolic hydroxyl-containing intermediate condensates produced by the novel process of the present invention can be further modified by incorporating additional dihydric phenol therein in the manner described in copending U.S. patent application Ser. No. 62,279, filed Oct. 12, 1960, and the resulting materials can then be dehydrohalogenated to give polyepoxide resins having specific, predetermined molecular weights.

As indicated hereinabove, applicants' novel process is especially suited to continuous operation. One suitable method of operating the process continuously can be briefly stated as involving introducing the dihydric phenol, epichlorohydrin and caustic alkali either continuously or at regular intervals into a first reaction zone, carrying out the condensation reaction in said first reaction zone, continuously withdrawing the resulting intermediate condensate (admixed with excess epichlorohydrin and, when it has not been separately removed, water) from said first reaction zone, subjecting said intermediate condensate to distillation to remove said excess epichlorohydrin and, when present, water, and then dehydrohalogenating the thus-purified intermediate condensate to give the desired linear polymeric glycidyl polyether. The particular feed rates, operating temperatures, and the like which will be employed in carrying out a continuous process are readily determinable by one skilled in the art from the foregoing detailed description of applicants' process in general.

Furthermore, it will be equally obvious to those skilled in the art that still other changes and variations can be made in carrying out the present invention without departing from the spirit and scope thereof as defined in the appended claims.

We claim:
1. A process for the preparation of a linear polymeric glycidyl polyether of a dihydric phenol represented by the general formula

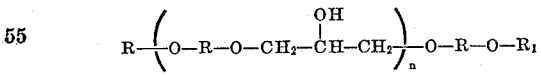

wherein R represents the nucleus of said dihydric phenol, $R_1$ represents the residue

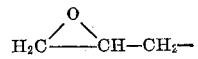

and $n$, which indicates the predetermined extent of polymerization, represents an average value of from about 0.25 to about 15, which comprises
  (1) bringing together said dihydric phenol and an excess of epichlorohydrin, in a mol ratio of from about 3 to about 20 mols of epichlorohydrin per mol of said dihydric phenol,
  (2) condensing, at a temperature of from about 50° C. to about 150° C. in the presence of caustic alkali as catalyst, only from about 1.05 to about 1.8 mols of epichlorohydrin per mol of said dihydric phenol, said condensation being controlled so as to give an intermediate condensate having a free phenolic hydroxyl content in the range of from about 0.2 to about 0.95 phenolic hydroxyl group per mol of said dihydric phenol initially present, said intermediate condensate being known by the equation $$OH = \frac{n}{n+1}$$

wherein OH represents the phenolic hydroxyl content of said intermediate condensate and $n$ is as defined hereinabove, to give on dehydrohalogenation said predetermined extent of polymerization as indicated by $n$, (3) removing excess epichlorohydrin from said intermediate condensate, and then (4) dehydrohalogenating said intermediate condensate to give said linear polymeric glycidyl polyether.

2. A process as described in claim 1 wherein said condensation is controlled by being carried out in the presence of from about 0.1 to about 1.5 mols of caustic alkali as catalyst per mol of said dihydric phenol.

3. A process as described in claim 2 wherein substantially all of the water of condensation present in the system is removed, thus stopping said condensation, once said condensation has gone to substantial completion.

4. A process as described in claim 2 wherein substantially all of the water of condensation formed during said condensation is removed as it is formed.

5. A process as described in claim 2 wherein said dihydric phenol is bisphenol A and said caustic alkali is sodium hydroxide.

6. A process as described in claim 2 wherein said dihydric phenol is bisphenol A and said caustic alkali is potassium hydroxide.

7. A process as described in claim 1 wherein said condensation is controlled by determining the phenolic hydroxyl content of said intermediate condensate analytically and removing substantially all of the water present in the system to stop said condensation when the required phenolic hydroxyl content is reached.

8. A process as described in claim 1 wherein said condensation is controlled by determining the phenolic hydroxyl content of said intermediate condensate by viscosity measurements and removing substantially all of the water present in the system to stop said condensation when the required phenolic hydroxyl content is reached.

9. A process as described in claim 7 wherein said dihydric phenol is bisphenol A and said caustic alkali is sodium hydroxide.

10. A process as described in claim 7 wherein said dihydric phenol is bisphenol A and said caustic alkali is potassium hydroxide.

11. A process as described in claim 1 carried out by continuously introducing said dihydric phenol, epichlorohydrin and said caustic alkali catalyst into a first reaction zone, carrying out said condensation in said first reaction zone, continuously withdrawing the resulting intermediate condensate from said first reaction zone, subjecting said intermediate condensate to distillation, and dehydrohalogenating the thus-purified intermediate condensate to give the desired linear polymeric glycidyl polyether.

12. A process as described in claim 11 wherein said dihydric phenol is bisphenol A and said caustic alkali is sodium hydroxide.

13. A process as described in claim 11 wherein said dihydric phenol is bisphenol A and said caustic alkali is potassium hydroxide.

References Cited

UNITED STATES PATENTS 2,841,595   7/1958   Pezzaglia _____ 260—47

WILLIAM H. SHORT, *Primary Examiner.*

T. D. KERWIN, *Assistant Examiner.*